United States Patent Office 3,299,202
Patented Jan. 17, 1967

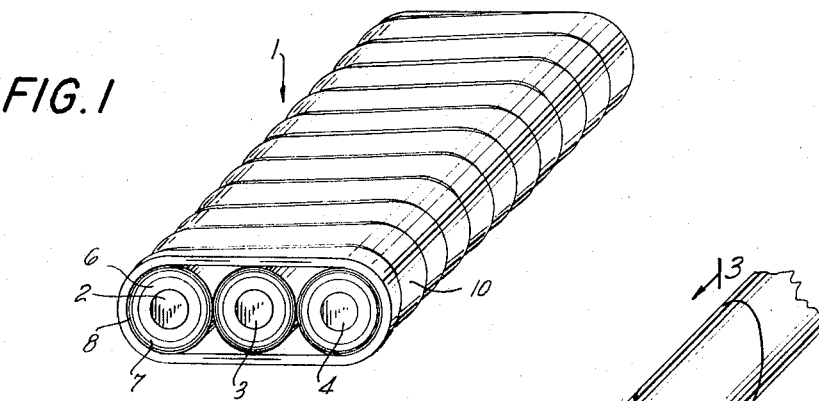
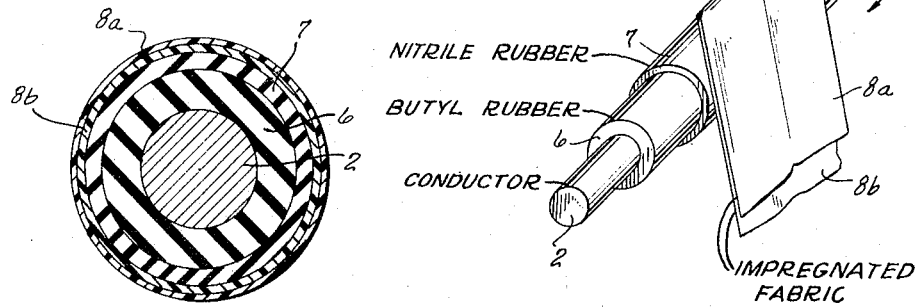
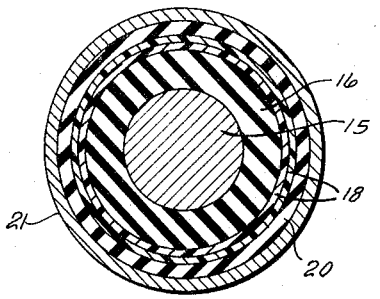
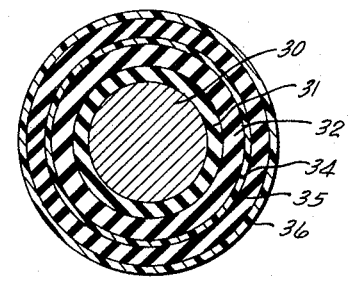

3,299,202
OIL WELL CABLE
Grover W. Brown, Glen Rock, N.J., assignor to The Okonite Company, Passaic, N.J., a corporation of Delaware
Filed Apr. 2, 1965, Ser. No. 445,119
8 Claims. (Cl. 174—121)

This invention relates to an electrical cable, and in particular, to a cable of the type used to carry power to an electric motor positioned at the bottom of an oil well.

An oil well cable should have a minimal cross-sectional area, so that it will occupy a small amount of space in the bore of the well. In particular, the cable should fit easily between the well casing and the pipe stem through which oil is pumped to the surface. It should also have longitudinal integrity and strength. In addition, it must withstand the severe physical and chemical environmental conditions that exist in oil well applications. In particular, it must be resistant to the various substances found in an oil well and must withstand their effects, especially hydrocarbons, brine, carbon dioxide, hydrogen sulfide and other corrosive agents. Moreover, the cable must be capable of withstanding the effects of such severe environmental conditions at elevated temperatures, as high, for example, as 250° to 300° F., for long periods of time.

In the past, oil well cable has usually been round in transverse section, over the major portion of its length. Often, at the bottom of the well, it has been the practice to splice a short section of flat three-conductor cable as a jumper to bypass the pump down the bore of the well to the motor housing. The short section of flat cable is used only because the pump has a larger diameter than the pipe into which it discharges, leaving very little available space.

The usual three-conductor round oil well cable has been made with each conductor insulated with a heat-resisting rubber insulation. The insulation was usually covered with a nylon braid reinforcement, which was often lacquered. Three thus-insulated conductors were cabled together and jacketed overall with a heat-resistant and oil-resistant rubber-like polymer, such as a nitrile rubber, to form a round cable, which was then encased in an interlocked armor of galvanized steel, stainless steel, Monel metal, or the like.

The usual three conductor flat oil well cable has been made with each conductor insulated with a heat-resistant silicone-impregnated glass tape. The insulated conductors were usually individually sheathed with lead, sometimes protected with a lacquered braid. Three thus-insulated conductors were laid in parallel in a flat configuration, then encased in an interlocked armor of galvanized steel, stainless steel, Monel metal, or the like. Attempts to replace the lead sheath with heat-resistant and oil-resistant rubber-like polymers have been unsuccessful, because the materials used have not stood up under the severe conditions that are encountered in use.

Cables of these kinds have provided reasonably satisfactory service, when the extremely severe service conditions are considered, but they are products where some improvements would be very desirable, particularly any improvements that would lengthen their effective service lives.

One object of the present invention is to provide an improved, practical oil well cable.

A more specific object of the invention is to provide a practical oil well cable in which the conductor insulation need not be protected by a lead sheath, and is therefore relatively light in weight, but that has electrical pertormance charactertistics that are comparable to those of lead-sheathed cable, and that can withstand the severe operating conditions that are usually encountered in oil well service.

A further object of the invention is to provide a serviceable oil well cable that is light in weight per unit of length, and that has adequate strength characteristics in terms of its weight per unit of length.

Another object of the invention is to provide a new kind of construction for an insulated conductor for a multiconductor oil well cable, that will permit fabrication of the cable in a practical, flat configuration over its entire length, so as to permit the use of either a larger pipe stem or a smaller casing, with obvious advantages in either case.

Other objects of the invention will be apparent hereinafter from the specification and the scope of the appended claims.

In the drawing:

FIG. 1 is a perspective view of a short section of a flat, three-conductor oil well cable that is constructed in accordance with one preferred embodiment of this invention;

FIG. 2 is a fragmentary perspective view of a section of one of the insulated conductors, with the successive strata about the conductor partly removed, better to show their relationship to each other;

FIG. 3 is a transverse section, on an enlarged scale, taken on the line 3—3 of FIG. 2, looking in the direction of the arrows;

FIG. 4 is a transverse action of an insulated conductor that is constructed in accordance with another preferred embodiment of the invention, and FIG. 5 is a transverse section of an insulated conductor that is constructed in accordance with still another preferred embodiment of the invention.

In general, an oil well cable that is constructed in accordance with a preferred embodiment of this invention comprises a plurality of insulated conductors that are similarly constructed and that are assembled in a desired configuration. Each of these insulated conductors comprises a conductor having insulation about it, a protective nitrile rubber jacket about the insulation, all reinforced with strips of strong, substantially non-stretchable tapes. One preferred tape is a woven glass fabric tape that is impregnated with an oil-resistant and heat-resistant rubber, such as, for example, nitrile rubber or a polyacrylate. The tape is applied about and confines the protective nitrile rubber jacket.

Such tape or tapes are substantially integrally bonded, through the rubber impregnant, to the nitrile rubber jacket, so as to create a monolithic structure. This integral union of the tape and the nitrile rubber jacket results in an internal stress under the swelling conditions that are so frequently encountered in oil well service, and causes the cable to retain or tend to retain its shape and its integrity. This monolithic structure is preferably further protected by being encased in interlocked armor.

Referring now in detail to the drawing, and particularly to FIG. 1 the armored, three-conductor, flat oil well cable 1 that is shown is formed with three metallic conductors 2, 3, and 4, respectively. Each of these conductors is insulated and protected in the same fashion. Thus, the conductor 2 is surrounded by a layer of insulation 6, that in turn is covered by a nitrile rubber jacket 7. One or more layers of impregnated glass tape are applied about the jacket and are integrally bonded thereto, to provide a monolithic structure, as will be described in greater detail presently. The three insulated and protected conductors are assembled so as to lie flat, and are snugly disposed within armor 10 formed of helically wound, interlocked steel tape.

The insulation 6 is a heat-resistant and water-resistant material such as, for example, a butyl rubber or an ethylene-propylene rubber composition. These or comparable materials are employed because they have the desired degree of moisture-resistance and heat-resistance, together with desirable electrical insulating qualities, even though they are characterized by a tendency to swell when in contact with hydrocarbons. The insulation may be applied to the conductor either in strip form or by extrusion.

The jacket 7 is formed from a nitrile rubber composition for several reasons. One important reason is that this material is substantially impervious to liquid hydrocarbons, although it is not completely impervious to the passage of hydrocarbons in vapor form. Moreover, nitrile rubber compositions are highly retentive of their properties even at the elevated service temperatures that are encountered in oil well applications. Another important reason is that this jacket material is readily bonded to a nitrile rubber impregnant in a reinforcing tape, to provide a strong, monolithic structure.

The reinforcing tape 8 may be formed from a wide range of base tape materials. Because of the severe service conditions that are encountered, however, it is preferred that the base tape be an inorganic material of relatively high strength characteristics, such as, for example, a glass or other ceramic fiber tape or an open or foraminous stainless steel tape, for optimum resistance to the hot liquid and gaseous hydrocarbons that constitute the environment at the bottom of an oil well. Whatever material may be selected to form the base of the tape, it is impregnated with a material that is readily compatible with and integrally bondable with the material that forms the jacket 7, and therefore, the base tape preferably is impregnated with a nitrile rubber composition. The impregnating material is applied in sufficient quantity to the base tape to both fill and coat it.

Although a single tape layer may be applied about the jacket, it is preferable to use two or more overlapping impregnated tapes such as the tapes 8a and 8b, as shown in FIGURES 2 and 3. In the drawing, these tapes are shown as separate entities in FIGURE 2 and as distinct layers in FIGURE 3. It should be understood that this is for purposes of illustration only, since the tapes or layers of tape are integral in the final product, and, while the several layers of tape (if more than one layer is used) may be helically wound one over the other, they may also be applied by intercalating, overlapping, etc.

In practice, after the impregnated tape or tapes have been applied about the jacket by winding under tension, so as to provide intimate contact, the insulated and protected conductor is then passed through an autoclave, to effect heat curing of the nitrile rubber composition that is employed both for the jacket 7 and as the impregnant for the tape or tapes. The heat curing causes the tape winding to become integrally bonded to the nitrile jacket to provide a monolithic structure of unique and highly desirable characteristics.

In this structure, the fabric base of the tape acts as a reinforcing material to limit any radial expansion that might tend to occur should the underlying insulation come in contact with hydrocarbon vapors or other deleterious materials that have penetrated the nitrile rubber jacket. At the same time, the nitrile rubber impregnant completely encases the tape base and protects it against the effects of the deteriorating materials that are found in the well and, as well, protects against mechanical damage due, for example, to normal flexing of the cable in use. The fabric base of tape and the nitrile rubber in which it is encased therefore provide a unique cooperative effect in strengthening and protecting the insulated conductor that would not be obtainable except in the unique construction in accordance with the present invention.

In an insulated and protected conductor that has been constructed as just described, in accordance with the present invention, any tendency to swell on the part of the insulation, under service conditions, places the tape, which preferably has been wound under tension, under additional tension. When the tape is sufficiently strong initially, a balanced structure results that is, in certain respects, even stronger than it was before swelling. This phenomenon is comparable to the strength of a wooden wheel about which an iron rim has been shrunk; the assembly has greater strength than either of its component parts. In the conductor of the present invention, the tape maintains the integrity of the whole and restrains the insulation against the loss of shape and integrity that would otherwise occur upon swelling. In effect, the tape opposes the entropy change that favors dissolution of the rubber insulation. The present construction is particularly effective because of the monolithic nature of the structure, that is, the effective integration of the reinforcing tape and the nitrile rubber jacket and the impregnant in the tape or tapes.

In the modified embodiment of the invention that is illustrated in FIGURE 4, a conductor 15 is enclosed within a layer of insulating material 16. A plurality of layers of nitrile rubber impregnated tape 18, of which two layers are shown in the drawing, are applied about the insulating layer. A nitrile rubber jacket 20 is extruded or otherwise applied directly over the tape layers and is integrally bonded to the impregnant in the tape layers, to form a monolithic structure, similar to that previously described. The integral structure is produced, as before, by heat curing. In this modification of the invention, however, the tape is disposed immediately adjacent the outer surface of the insulating layer, rather than immediately adjacent the outer surface of the nitrile rubber jacket. This monolithic structure is further strengthened by an outer stratum of metal armor 21.

In the modification of the invention that is illustrated in FIGURE 5, the conductor 30 is embedded within an insulating layer 31, which in turn is covered by an extruded or otherwise applied layer 32 of nitrile rubber. A winding 34 of plain glass fabric or stainless steel fabric tape is tightly applied about the jacket. Several layers of the tape could be used in the event that greater strength were required for a particular application. However, in this embodiment of the invention, and at this location in the structure, it is preferred that a single layer be employed, or at most, two layers. Another layer 35 of nitrile rubber is extruded about the tape winding 34, to encase it completely, and an outer wrapping 36 of one or more layers of nitrile rubber impregnated tape is applied about the outer portion 35 of the nitrile rubber jacket. After curing of this structure in the usual fashion, a monolithic structure is again produced.

While several embodiments of the invention have been described in detail, it should be appreciated that other modifications of the invention are contemplated, to meet particular application requirements. For example, any one of the illustrated embodiments of the invention could be further strengthened by the application, either directly over the outer surface of the nitrile rubber jacket or over the surface of the impregnated tape coating, as appropriate to the particular structure under consideration, of an imperforate metal tape, for additional protection. This would provide additional radial strength.

For forming the protective jacket, whether in a single or in plural layers, and for impregnating the reinforcing tape, many different tapes of nitrile rubber may be employed. Most nitrile rubbers are characterized by a high oil resistance and such rubbers will work satisfactorily in my invention. Rubbers having a high acrylonitrile content, to minimize swelling, and low sulfur content, for best heat resistance, are preferred. Formulations of nitrile rubbers, and their characteristics, are well known in the art. See, for instance, the formulations disclosed in the text Synthetic Rubber, edited by G. S. Whitby, John Wiley and Sons, Inc., 1954, pages 794 et seq. The important thing, however, is not the particular formulation used, but rather the curing of the rubber together with the impregnated tape to provide an integrated, monolithic structure. To this end, the tape should be thoroughly prefilled and coated with the nitrile rubber before being wrapped about the cable.

It is believed best to use the same nitrile rubber composition for the tape as for the jacket, but different types may be used as long as they are compatible of being cured to form a unitary structure.

While nitrile rubber compositions are preferred, other oil-resistant and heat-resistant rubbers, such as the polyacrylate rubbers, can also be employed. For example, the polyacrylate rubbers that are vulcanized with relatively simple systems based on ammonium benzoate are satisfactory. Elastomers of this kind are inherently free of chlorine, have outstanding heat and oil resistance, and good processing characteristics.

The base tape used in the practice of my invention is preferably one with high tensile strength and little or no stretchability, so that it may be applied under tension and will oppose swelling of the insulation. It should also be resistant to the corrosive agents and heat found in the well, even though it is covered with nitrile. Woven glass fabric serves this purpose. Generally, any inorganic fiber tape, having the requisite strength and other properties, may be used. For example, synthetic aluminum silicate tapes can be used, and, as well, tapes woven from blends of inorganic fibers, such as synthetic aluminum silicate fibers, with polyacrylonitrile or other heat-resistant synthetic organic fibers. Woven metal tapes or their equivalent are also satisfactory, and stainless steel is preferred for this purpose. In applying the tape, sufficient tension preferably should be employed to remove residual stretch.

The present invention permits the construction of flat multi-conductor oil well cable at sufficiently low cost so that flat cable may be used for the entire depth of the well, thus permitting more efficient use of the remaining space in the bore of the well.

While the invention has been described by reference to the details of a few preferred embodiments, it is to be understood that such description is intended in an illustrative rather than a limiting sense, and it is contemplated that various modifications in the composition, construction and arrangement of the parts will readily occur to those skilled in the art, within the spirit of the invention and the scope of the appended claims.

I claim:

1. An oil well cable that is resistant to the chemical agents found in oil wells, including at least one electrical conductor, an insulating layer formed about said conductor from a polymeric material that is swellable upon contact with hydrocarbons, and a protective jacket formed about said insulating layer, said protective jacket including a layer of nitrile rubber and a layer of tape that is resistant to dimensional change and that is disposed substantially concentric with the insulating layer, said tape being impregnated with nitrile rubber, said tape and said layer of nitrile rubber being cured together into an integral, monolithic mass whereby swelling is restrained in the presence of hydrocarbons.

2. The oil well cable of claim 1, in which said layer of tape is adjacent the outside surface of said layer of nitrile rubber.

3. An oil well cable capable of carrying electrical power to the lower end of the bore of an oil well and that is resistant to the chemical agents found therein, including an electrical conductor, an insulating layer about said conductor, a layer of nitrile rubber about said insulating layer, and a plurality of layers of glass tape wrapped about said nitrile rubber, said tape being impregnated with nitrile rubber, said tape and said layer of nitrile rubber being cured together to form an integral protective jacket about said conductor and said insulating layer.

4. The oil well cable of claim 3, in which said insulating layer is formed from an elastomeric material that is swellable upon contact with hydrocarbon.

5. An oil well cable for operating a multiphase electrical motor at the bottom of an oil well shaft including at least three electrical conductors, an insulating layer formed about each of said conductors, a protective jacket formed about each of said insulating layers, each of said protective jackets including a layer of nitrile rubber and at least one layer of a substantially non-stretchable tape concentric therewith, said tape being impregnated with nitrile rubber having a composition that is compatible with the nitrile rubber of said protective jacket, said tape and said layer of nitrile rubber being cured together into an integral monolithic mass whereby swelling of the insulating layer is restrained in the presence of chemical agents of the type found in oil wells, said electrical conductors and their respective said layers being positioned adjacent one another in a common plane, and armor surrounding all of said conductors and said layers whereby said oil well cable has a flat configuration.

6. The oil well cable of claim 5, in which said tape is made of an inorganic synthetic fiber.

7. The oil well cable of claim 5, in which said tape is made of glass fabric and is applied under tension.

8. An oil well cable adapted for use in oil wells, including an electrical conductor, an insulating layer formed about said conductor, a plurality of layers of nitrile rubber and a plurality of layers of substantially non-stretchable tape concentrically surrounding said insulating layer, said nitrile rubber layers alternating with said tape layers, said tape layers being embedded in said nitrile rubber layers and being applied under tension, said tape layers and said nitrile rubber layers being cured together to form an integral unit.

References Cited by the Examiner

UNITED STATES PATENTS

| | | | |
|---|---|---|---|
| 1,458,803 | 6/1923 | Burley | 174—121 |
| 2,181,632 | 11/1939 | Winkelmann | 174—121 |

OTHER REFERENCES

The Condensed Chemical Dictionary 6th edition, Reinhold, New York, 1961, p. 851.

LARAMIE E. ASKIN, *Primary Examiner.*

E. GOLDBERG, *Assistant Examiner.*